US012800038B2

(12) United States Patent
Hermans et al.

(10) Patent No.: US 12,800,038 B2
(45) Date of Patent: Nov. 17, 2026

(54) FOUR-WAY VALVE AND DRYER PROVIDED WITH SUCH A FOUR-WAY VALVE

(71) Applicant: ATLAS COPCO AIRPOWER, NAAMLOZE VENNOOTSCHAP, Wilrijk (BE)

(72) Inventors: Hans Hermans, Wilrijk (BE); Geert Van Rompaey, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/861,513

(22) PCT Filed: Apr. 17, 2023

(86) PCT No.: PCT/IB2023/053907

§ 371 (c)(1),
(2) Date: Oct. 29, 2024

(87) PCT Pub. No.: WO2023/214227

PCT Pub. Date: Nov. 9, 2023

(65) Prior Publication Data

US 2025/0290568 A1 Sep. 18, 2025

(30) Foreign Application Priority Data

May 5, 2022 (BE) .................................. 2022/5342

(51) Int. Cl.
*F16K 11/085* (2006.01)
*B01D 53/26* (2006.01)
(Continued)

(52) U.S. Cl.
CPC ........ *F16K 11/0853* (2013.01); *B01D 53/261* (2013.01); *F16K 27/065* (2013.01); *F16K 27/08* (2013.01)

(58) Field of Classification Search
CPC .... F16K 11/0853; F16K 27/065; F16K 27/08; B01D 53/261; Y10T 137/86839; Y10T 137/86751
See application file for complete search history.

(56) References Cited

U.S. PATENT DOCUMENTS 2,282,455 A * 5/1942 Church .................. F16K 5/184
251/160
2,414,966 A * 1/1947 Melichar ................ F16K 5/184
29/890.13

(Continued)

FOREIGN PATENT DOCUMENTS

CH 405849 1/1966
CN 202032127 11/2011

(Continued)

OTHER PUBLICATIONS

Belgium Search Report and Written Opinion issued in BE Application No. 202205342, dated Nov. 30, 2022, 12 pages.

(Continued)

*Primary Examiner* — Jessica Cahill
(74) *Attorney, Agent, or Firm* — HSML P.C.

(57) ABSTRACT

Four-way valve provided with a housing with a central bore and four connections for conduits or the like communicating with the central bore and with a valve body rotatably arranged within the central bore. The central bore is cylindrical, and the connections are in communication with a cylinder jacket of the central bore. The valve body includes a valve blade extending along the axial direction of the central bore and two round-shaped sealing discs provided at the edges of the valve blade extending in the radial direction of the central bore, all this such that these round-shaped sealing discs seal the central bore. In a transverse section of the valve blade, the edges, extending in the axial direction,
(Continued)

are formed as circular arcs with a central angle between 30° and 90°.

19 Claims, 6 Drawing Sheets

(51) Int. Cl.
*F16K 27/06* (2006.01)
*F16K 27/08* (2006.01)

(56) References Cited

U.S. PATENT DOCUMENTS

| | | | | | |
|---|---|---|---|---|---|
| 3,191,628 | A * | 6/1965 | Kirkwood | F16K 11/0853 137/625.23 |
| 4,142,708 | A * | 3/1979 | Brown | F16K 27/00 251/317 |
| 4,197,095 | A * | 4/1980 | White, Jr. | B01D 53/261 95/122 |
| 4,393,893 | A * | 7/1983 | Alexander | F16K 5/225 184/105.3 |
| 4,601,114 | A * | 7/1986 | Noguchi | B29B 13/065 96/112 |
| 4,774,977 | A * | 10/1988 | Cohen | F16K 27/10 137/271 |
| 5,988,219 | A * | 11/1999 | Larsen | F16K 11/0853 137/625.46 |
| 7,789,942 | B2 * | 9/2010 | Vanderstraeten | B01D 53/06 96/380 |
| 9,816,618 | B2 * | 11/2017 | Yates | F16K 1/222 |
| 11,226,045 | B1 * | 1/2022 | Richard | F16K 15/144 |
| 12,674,515 | B2 * | 7/2026 | Feng | F16K 11/0853 |
| 2005/0081930 | A1 * | 4/2005 | Margiott | H01M 8/0258 137/625.46 |
| 2006/0162792 | A1 * | 7/2006 | Oh | F16K 11/0873 137/625.41 |
| 2014/0090414 | A1 * | 4/2014 | McLane | F16K 5/0471 62/115 |

FOREIGN PATENT DOCUMENTS

| | | | | |
|---|---|---|---|---|
| CN | 220646862 | | 3/2024 | |
| DE | 4106622 | A1 * | 9/1992 | F16K 11/0853 |
| FR | 2949527 | | 3/2011 | |
| GB | 992977 | A * | 5/1965 | F16K 11/0853 |
| WO | 03/014577 | | 2/2003 | |
| WO | 2016/016185 | | 2/2016 | |

OTHER PUBLICATIONS

International Search Report and Written Opinion issued in PCT/IB2023/053907, mailed Jul. 7, 2023, 13 pages.
Chinese Office Action issued in CN Application No. 202310485424.0, dated Aug. 29, 2025, 19 pages, English translation.

* cited by examiner

FOUR-WAY VALVE AND DRYER PROVIDED WITH SUCH A FOUR-WAY VALVE

The present invention relates to a four-way valve.

A four-way valve is already known and is used to flowably connect four conduits with each other in different ways.

Traditionally, such a four-way valve comprises a housing with a valve body rotatably arranged therein.

This valve body takes the form of a sphere or ball that can rotate in a bore of the housing, provided for this purpose.

In order to realize the connection between the conduits that are connected to the four-way valve, a number of bores are provided in said sphere or ball, which provide a connection between the relevant conduits when the sphere or ball is in one of the correct positions.

By switching between the different positions of the sphere or ball, different conduits can be interconnected.

Thus, for example, in one position conduit 1 and conduit 2, respectively conduit 3 and conduit 4 can be interconnected, while in a second position conduit 1 and 4, respectively conduit 2 and 3 can be interconnected.

A disadvantage of the known four-way valves is that there will be a relatively large pressure drop across the valve because the perforations in the sphere or ball form a restriction for the flow of the fluid.

Another disadvantage is that the existing valves are relatively expensive and heavy.

Also, the known four-way valves use sealings in the form of, for example, rubber rings and the like.

As a result, these valves should not be exposed to high temperatures as this will corrode the rubber sealings.

In addition, these sealings should be replaced on a regular basis.

SUMMARY OF THE INVENTION

The present invention aims to provide a solution to at least one of said and/or other disadvantages.

The present invention relates to a four-way valve provided with a housing with a central bore and four connections for conduits or the like communicating with the central bore and provided with a valve body that is rotatably arranged within the central bore, characterized in that the central bore is cylindrical, wherein the connections are in communication with a cylinder jacket of the central bore, wherein the valve body comprises a valve blade extending along the axial direction of the central bore and two round-shaped sealing discs provided at the edges of the valve blade extending in the radial direction of the central bore, all this such that these round-shaped sealing discs seal the central bore, wherein; in a transverse section of the valve blade, the edges, extending in the axial direction, are formed as circular arcs with a central angle between 30° and 90°.

An advantage of such a four-way valve according to the invention is that the pressure drop across the valve will be very minimal and lower than in the known four-way valves.

This is because the flow opening for the fluid in the housing is larger compared to the four-way valves with a ball or spherical valve body.

In other words, the fluid will hardly experience any restriction.

Because the valve body comprises a valve blade instead of a ball or spherical valve body, the four-way valve will also be much lighter.

Because in a transverse section of the valve blade, the edges extending in the axial direction, are formed as circular arcs with a central angle between 30° and 90°, it is ensured that the length of the quasi-contact surface in the radial direction between valve edge and housing is sufficiently long such that the leakage path thus created will cause only minimal leakage.

By transverse section is meant here a section of the valve blade along a plane perpendicular to the axial direction of the central bore.

Quasi-contact or quasi-contact surface refers here to the fact that the valve blade does not contact the walls of the housing that define the central bore.

Indeed, in a practical embodiment, said circular arcs will be located on the same circle, which has a radius that is 0.1 mm to 1 mm smaller than the radius of the central bore.

An advantage is that by creating this clearance between valve blade and housing, no friction will occur and at the same time leaks will be kept to a minimum.

Preferably, the height of the central bore is larger than or equal to the diameter of the connections for the conduits.

This has the advantage that the surface of the flow opening becomes larger, which contributes to the reduction of the pressure drop.

In a preferred embodiment, the thickness of the valve blade increases towards the edges of the valve blade extending in the axial direction, wherein the central angle is between 30° and 90°.

In other words, the valve blade will have thickened edges. In this way, a thin valve blade, and therefore also a very light valve blade, can be realized.

Only the edges will be thicker to ensure that leaks are kept to a minimum.

Preferably, the valve body is provided with two projecting taps extending along the axial direction of the valve body.

These taps can be used to drive the valve body by means of an actuator or motor.

In a preferred embodiment, the four-way valve is provided with a position switch that is directly connected to one of said protruding taps.

Because the position switch is directly coupled to the valve body, it will always detect the actual position of the valve body.

This in contrast to the well-known four-way valves where the position switch is coupled to said actuator. In this case, failure of the actuator leads to incorrect feedback of the position of the valve body.

Preferably, the diameter of the sealing discs is equal to the diameter of the central bore.

This has the advantage that no or hardly any leaks can occur along the sealing discs.

In a practical embodiment, the circumferential edges of the sealing discs are provided with at least one groove.

This groove or grooves run around the circumferential edge and will reduce the contact area between the sealing discs and the housing and thereby reduce friction.

In the most preferred embodiment, the four-way valve is free of sealings between the valve blade and the housing.

This is possible due to the design of the valve blade, which minimizes leaks and eliminates the need for rubber sealings.

An advantage is that the valve can be exposed to high temperatures.

The invention also relates to a dryer for drying a compressed gas, which dryer comprises at least two vessels containing therein a regenerable desiccant and a controllable valve system, wherein this valve system is such that at least one vessel is always being regenerated while the other vessels dry the compressed gas, whereby the vessels are successively regenerated in turn by control of the valve system, and wherein the dryer is provided with a regeneration conduit for supplying a hot regeneration gas to the vessel being regenerated, characterized in that the regeneration conduit of the dryer is provided with of a four-way valve according to the invention.

The valve system of such dryers is such that at least one vessel is always regenerated while the other vessels dry the compressed gas.

By controlling the valve system, the vessels are successively regenerated in turn.

The hot regeneration gas is sent through the saturated desiccant by means of a blower. Here, the four-way valve according to the invention is used, which is switched after regeneration in order to subsequently cool the regenerated desiccant with the aid of a cooling gas.

During the regeneration step, the four-way valve is thus exposed to very high temperatures. A four-way valve according to the invention can be used in this application in contrast to the known valves which can fail at these high temperatures.

After all, the four-way valve according to the invention is resistant to very high temperatures, as already stated above.

This allows to use a hotter regeneration gas and thus speed up the regeneration process.

This, in combination with the advantages described above, makes the four-way valve according to the invention particularly suitable in combination with a compressed gas dryer.

BRIEF DESCRIPTION OF THE DRAWINGS

With the intention of better demonstrating the features of the invention, some preferred embodiments of a four-way valve and a dryer according to the invention are described below, by way of example without any limiting character, with reference to the accompanying drawings, in which.

DETAILED DESCRIPTION OF THE INVENTION

Figure 1:
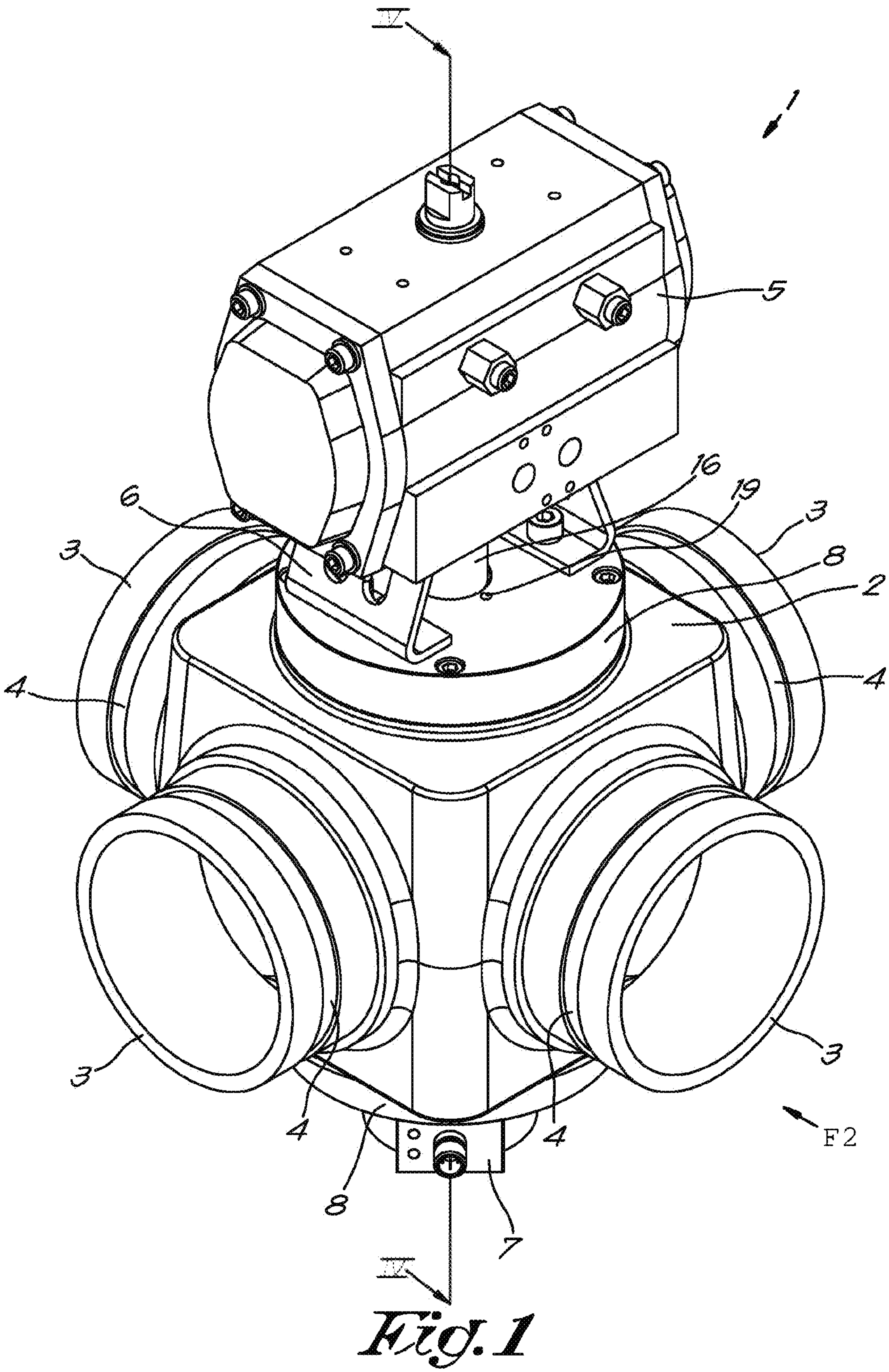
FIG. 1 schematically and in perspective shows an embodiment of a four-way valve according to the invention.
Figure 2:
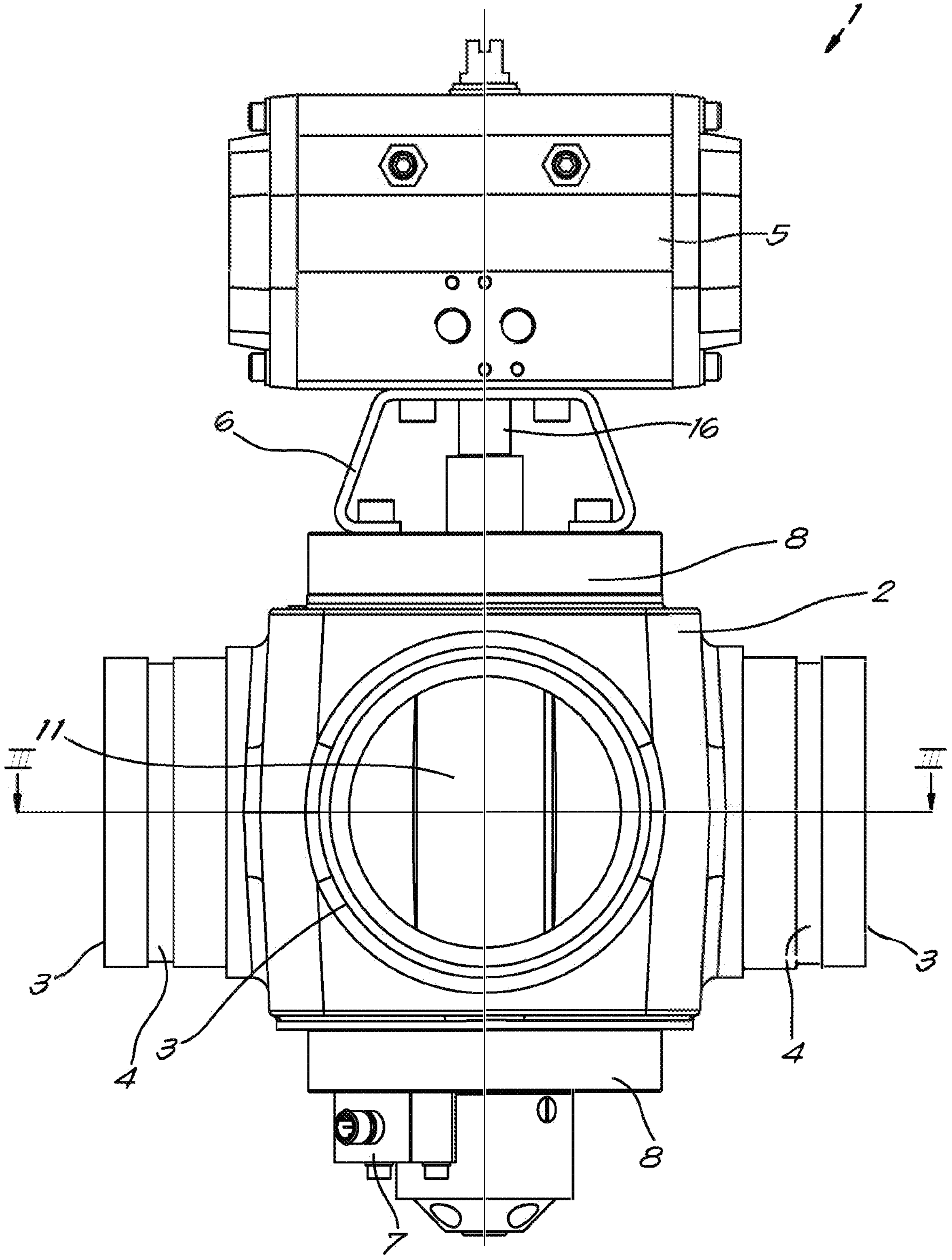
FIG. 2 shows a side view along the arrow F2 of FIG. 1.

The four-way valve 1, shown in FIGS. 1 and 2, mainly comprises a housing 2.

The housing 2 is provided with four connections 3 for conduits or the like. These conduits are not shown in the figures for the sake of simplicity.

Said connections 3 are provided with a provision 4, in this case designed in the form of a notch, for fitting mechanical quick-couplings.

As can be seen in FIGS. 1 and 2, the housing 2 is symmetrical implemented in this case. As will be explained later, the interior of the housing 2 is also completely symmetrical.

However, it is not excluded for the invention that the housing can also be implemented asymmetrically.

In this case, the housing 2 is made by casting.

Furthermore, the four-way valve 1 is also provided with an actuator 5 for operating the four-way valve 1. In this case, the actuator 5 is placed on the housing 2 via a mounting bracket 6.

In addition to the actuator 5, the four-way valve 1 is also provided with a position switch 7 which can register the position of the four-way valve 1.

The housing 2 is also provided with two sealing covers 8. It is on one of these sealing covers 8 that said mounting bracket 6 is mounted.

Figure 3:
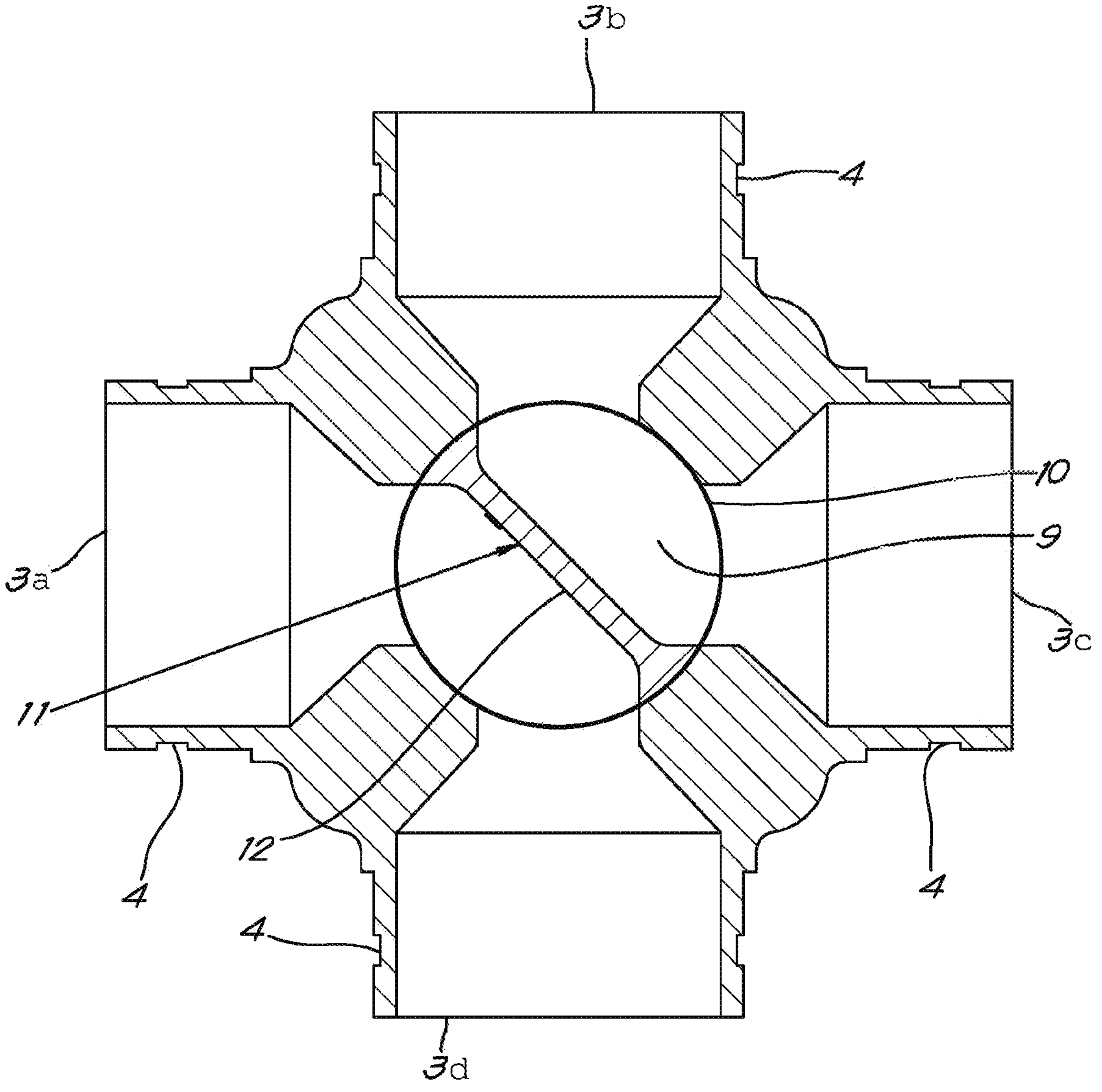
FIG. 3 shows a cross-section according to the line III-III of FIG. 2.
Figure 4:
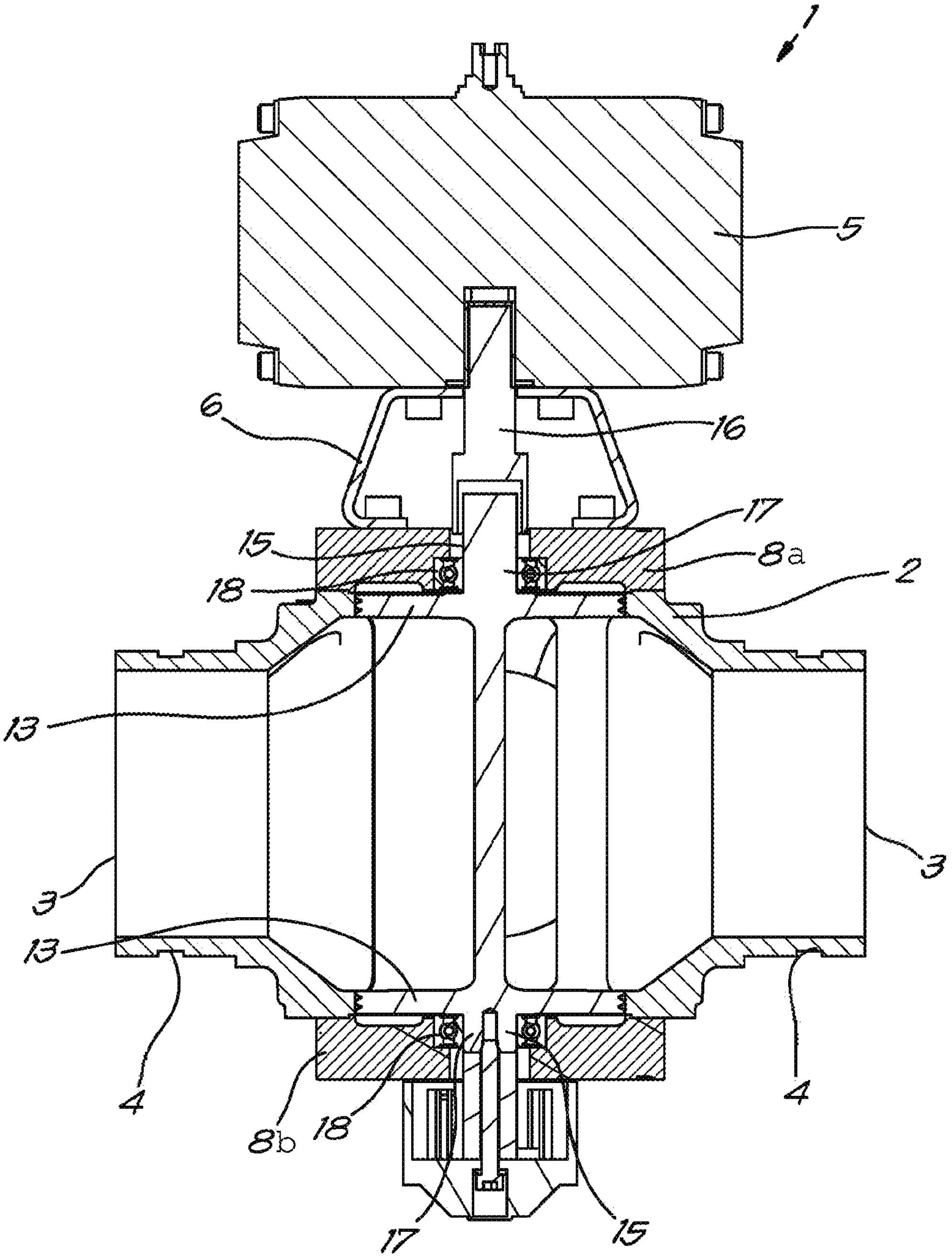
FIG. 4 shows a cross-section according to the line IV-IV of FIG. 1.

In FIGS. 3 and 4, the interior of the housing 2 is shown.

As can be seen from these figures, the housing 2 is provided with a central bore 9 with a cylindrical shape. Said connections 3 are in communication with a cylinder jacket 10 of the central bore 9.

In this way, a fluid can flow from one conduit, connected to a first connection 3, to another conduit, connected to a second connection 3.

As can be seen in FIG. 4, the height of the central bore 9 is larger than the diameter of the connections 3 for the conduits, although the height of the central bore 9 could also be equal to the diameter of the connections 3.

As can be deduced clearly from FIG. 3, and as already mentioned above, the interior of the housing 2 is also implemented symmetrically.

The four-way valve 1 is also provided with a valve body 11 rotatably arranged in the central bore 9.

The valve body 11 may also be made by casting, but the invention is not limited thereto.

The valve body 11 comprises a valve blade 12 extending in the axial direction of the central bore 9. This means that the valve blade 12 is, as it were, arranged upright in the central bore 9.

In addition, the valve body 11 also comprises two round-shaped sealing discs 13. These are located at the edges of the valve blade 12 extending in the radial direction of the central bore 9. In other words, at the top and bottom of the valve blade 12 or of the central bore 9. These round-shaped sealing discs 13 will hereby seal the central bore 9.

In this case, the diameter of these sealing discs 13 is equal to the diameter of the central bore 9. This will ensure that the central bore 9 is sealed, such that no or hardly any fluid can leak.

In order to reduce the friction between the housing 2 and the sealing discs 13, the circumferential edges of the sealing discs 13 in this example are provided with at least one groove 14.

Herein, the groove 14 preferably runs completely around the circumferential edges.

Figure 5:
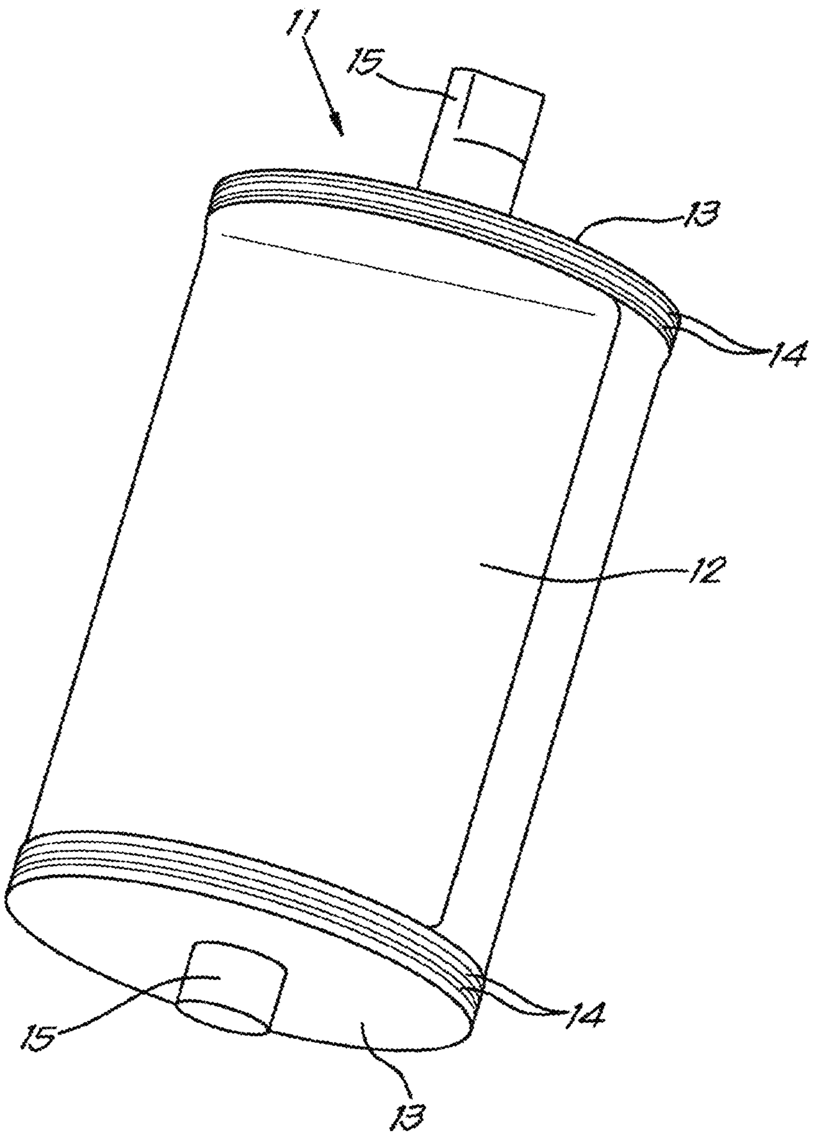
FIG. 5 schematically and in perspective shows the valve body of the four-way valve of FIGS. 1 to 4.

This is shown in FIG. 5.

As can be clearly seen in FIG. 3, the thickness of the valve blade 12 increases towards the edges of the valve blade 12 extending in the axial direction.

In other words, the edges of the valve blade 12 extending in the axial direction of the central bore 9 are thickened.

However, alternatively, it is also possible that the valve blade 12 is implemented rectangularly and flat, i.e. without thickened edges.

Although not necessary for the invention, the valve blade 12 is symmetrically implemented in the embodiment of the figures.

As can be seen in the figures, the valve body 11 is arranged symmetrically in the central bore 9, i.e. the center lines coincide.

It is not excluded for the invention that the valve blade 12 can be implemented asymmetrically and/or that the center lines of the central bore 9 and the valve body 11 do not coincide.

In a transverse section of the valve blade 12, the edges extending in the axial direction are formed as circular arcs with a shape complementary to the central bore 9.

The circular arcs enclose a central angle between 30° and 90°.

In this case, and preferably, the two arcs lie on the same circle which has a radius that is 0.5 mm smaller than the radius of the central bore 9. The invention is not limited to this, but the radius of the arcs is at preferably 0.1 mm to 1 mm smaller than the radius of the central bore 9.

As shown in FIG. 5, the valve body 11 is preferably provided with two projecting taps 15 or pins extending along the axial direction of the valve body 11.

These taps 15 are used to rotate or switch the valve body 11.

For this purpose, the four-way valve 1 is provided with the actuator 5 as shown in FIGS. 1 and 4.

The actuator 5 is coupled to one of said protruding taps 15.

As shown in FIG. 4, use is made here of a coupling piece 16 which is slid over said tap 15. Thus, it is by means of this coupling piece 16 that the actuator 5 is connected to the valve body 11. Of course, the actuator 5 can also be connected directly to the protruding tap 15.

The use of the coupling piece 16 allows to accommodate for small clearances when mounting the actuator 5 using the coupling piece 16.

Said projecting tab 15, which is not coupled to the actuator 5, is used as a position switch 7. This position switch 7 is directly connected to this projecting tab 15.

On the basis of the rotation or switching of the valve body 11 and hence, also of this protruding tap 15, the position switch 7 will register the position or location of the four-way valve 1.

Because the position switch 7 is directly connected to this tap 15, the registration will be very dependable.

In the example shown, the four-way valve 1 is also provided with two sealing covers 8 as shown in FIGS. 1, 2 and 4.

The sealing covers 8 are fitted over said sealing discs 13 and they seal the housing 2 to protect the valve body 11.

FIG. 4 shows that the sealing covers 8, in this case, are provided with passages 17 provided for this purpose, through which the protruding taps 15 of the valve body 11 extend.

In this way, the actuator 5 and the position switch 7 can be arranged on the outside of the housing 2.

These sealing covers 8 are provided with roller bearings 18 with which the protruding taps 15 of the valve body 11 can rotate relative to the housing 2.

Roller bearings 18 have the advantage that they are less adversely affected by high temperatures than, for instance, plain bearings.

In order to be able to easily remove the roller bearings 18, if necessary, at least one hole 19 is provided through the sealing covers 8 for removing the roller bearings 18 by means of a pin or punch.

As can be seen in FIG. 4, said sealing discs 13 form a barrier against dust and dirt for said roller bearings 18 in the sealing covers 8. Thus, any contaminants in the fluid will not come into contact with the roller bearings 18.

In addition, the one sealing cover 8*a* is also provided with screw holes or the like for mounting the mounting bracket 6, while the other sealing cover 8*b* is provided with screw holes or the like for mounting the position switch 7.

For the sake of completeness, it is also noted here that the four-way valve 1 is completely free of sealings between the valve blade 12 and the housing 2 and also at other locations in the four-way valve 1.

This is very advantageous because the valve can then be used for applications where the fluids used reach or may reach a temperature of 160° C. or higher.

As a result, the four-way valve 1 can be used in dryers 20 with a regenerable desiccant 21, where a warm or hot gas is used for the regeneration of the saturated desiccant 21.

Figure 6:
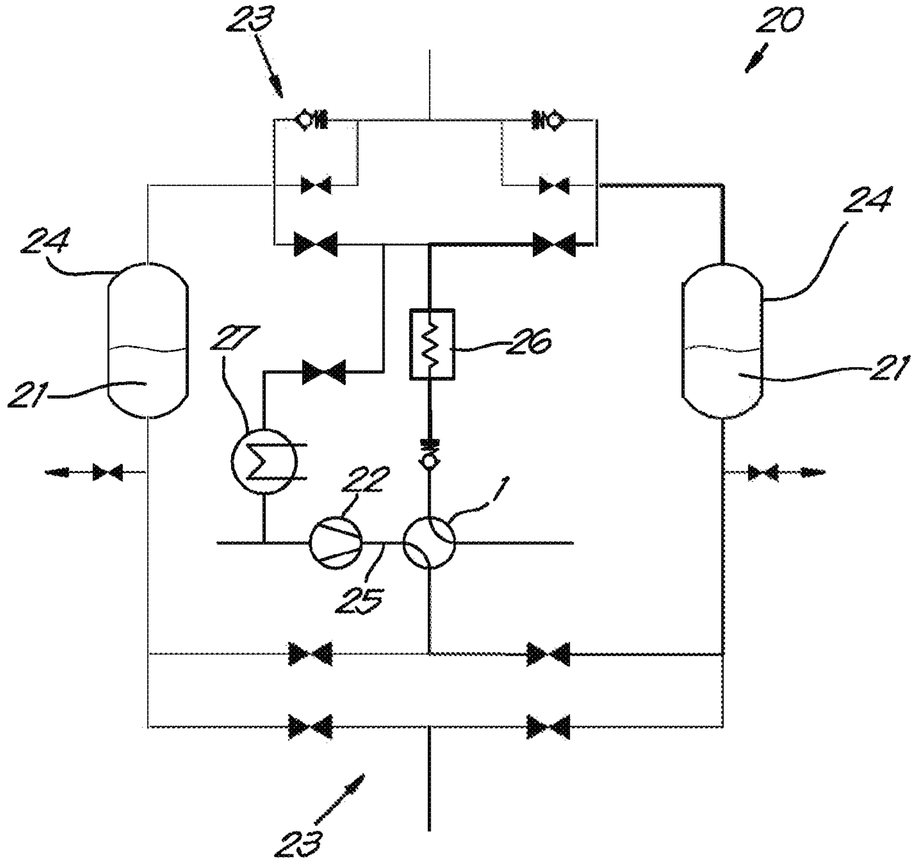
FIG. 6 schematically shows a possible embodiment of a dryer with a four-way valve according to the invention therein.

Such dryers 20 already exist wherein the hot regeneration air is sent through the saturated desiccant 21 by means of a blower 22. Such a dryer 20 is shown in FIG. 6 and comprises a controllable valve system 23 and, in this case, two vessels 24 that are filled with the regenerable desiccant 21, although this could also be more than two vessels 24.

The valve system 23 is such that at least one vessel 24 is always being regenerated while the other vessels 24 dry the compressed gas.

By controlling the valve system 23, the vessels 24 are successively regenerated in turn.

The dryer 20 is further provided with a regeneration conduit in which a heater 26 is incorporated for supplying the hot regeneration gas to the vessel 24 in which the saturated desiccant 21 is regenerated.

This hot regeneration gas is sent through the saturated desiccant 21 by means of the blower 22. The four-way valve 1 according to the invention is used here.

Thus, during the regeneration step, the four-way valve 1 is exposed to very high temperatures. A four-way valve 1 according to the invention can be used in this application, in contrast to the known valves, which may fail at these high temperatures.

After the regeneration, the four-way valve 1 is switched to subsequently cool the regenerated desiccant 21 with the aid of a cooling gas which passes through a cooler 27.

The operation of the four-way valve 1 is very simple and as follows.

Initially, the four-way valve 1 is, for example, in a certain position as can be seen in FIG. 3. This figure clearly shows that the valve body 11 is positioned such that the connections 3*a* and 3*d*, and 3*b* and 3*c*, respectively, are in communication with each other.

At a certain moment, a command is given to the four-way valve 1 to connect the terminals 3*a* and 3*b*, and 3*c* and 3*d*, respectively.

Subsequently, the actuator 5, which is connected to the valve body 11 by means of the coupling piece 16, will rotate the valve body 11 to the desired position.

When the valve body 11 is rotated through 90°, the position switch 7 is actuated by one of the protruding taps 15 of the valve body 11. In this way, the position or location of the valve body 11 is registered and fed back to the actuator 5.

The terminals 3*a* and 3*b*, and 3*c* and 3*d*, respectively, are now interconnected.

The valve body 11 can also be driven in other ways than with said actuator 5. For example, the valve body 11 could also be manually rotated or switched to the desired position.

It is obvious that the connections 3 can be coupled by means of any type of coupling. For instance, the provisions 4 can also be implemented as flanges or the like.

The present invention is by no means limited to the embodiments described by way of example and shown in the figures, but a four-way valve and a dryer according to the invention can be realized in all kinds of shapes and dimensions without departing from the scope of the invention.

The invention claimed is:

1. A four-way valve provided with a housing with a central bore and four connections for conduits communicating with the central bore and provided with a valve body that is rotatable arranged within the central bore, wherein the central bore is cylindrical, wherein the connections are in communication with a cylinder jacket of the central bore, wherein the valve body comprises a valve blade extending along the axial direction of the central bore and two round-shaped sealing discs provided at the edges of the valve blade extending in the radial direction of the central bore, all this such that these round-shaped sealing discs seal the central bore, wherein, in a transverse section of the valve blade, a main body of the valve blade is flat and rectangular between the edges and only the edges, extending in the axial direction, have a thickness greater than a thickness of the main body and are formed as circular arcs with a central angle between 30° and 90°; and, the housing is provided with two sealing covers which are arranged over said sealing discs, wherein circumferential edges of the two round-shaped sealing discs are provided with a plurality of grooves that are configured to reduce a contact area between the two round-shaped sealing discs and the housing to reduce friction between the circumferential edges of the two round-shaped sealing discs and the housing during rotation.

2. The four-way valve according to claim 1, wherein said circular arcs are located on the same circle, which has a radius which is 0.1 mm to 1 mm smaller than a radius of the central bore.

3. The four-way valve according to claim 2, wherein said circular arcs have the radius which is 0.5 mm smaller than the radius of the central bore.

4. The four-way valve according to claim 1, wherein the valve body is symmetrically implemented.

5. The four-way valve according to claim 1, wherein the housing is symmetrically implemented.

6. The four-way valve according to claim 1, wherein the housing and the valve body are manufactured by means of casting.

7. The four-way valve according to claim 1, wherein the valve body is provided with two protruding taps which extend according to the axial direction of the valve body.

8. The four-way valve according to claim 7, wherein the four-way valve is provided with an actuator for rotating the valve body, wherein the actuator is coupled to one of said protruding taps.

9. The four-way valve according to claim 8, wherein the actuator is coupled to said tap via a coupling piece which is slid over said tap.

10. The four-way valve according to claim 7, wherein the actuator is arranged on the housing by means of a mounting bracket.

11. The four-way valve according to claim 7, wherein the four-way valve is provided with a position switch which is directly connected to one of said protruding taps.

12. The four-way valve according to claim 1, wherein said sealing covers are provided with passages through which protruding taps of the valve body extend.

13. The four-way valve according to claim 12, wherein the passages in the sealing covers are provided with roller bearings with which the protruding taps of the valve body can rotate relative to the housing.

14. The four-way valve according to claim 13, wherein at least one hole is provided through the sealing covers in order to be able to remove the roller bearings by means of a pin or a punch.

15. The four-way valve according to claim 1, wherein a diameter of the sealing discs is equal to a diameter of the central bore.

16. The four-way valve according to claim 1, wherein said connections for the conduits are provided with a provision for arranging mechanical quick-couplings.

17. The four-way valve according to claim 1, wherein the four-way valve is free of sealings between the valve blade and the housing.

18. The four-way valve according to claim 1, wherein a height of the central bore is larger than or equal to a diameter of the connections for the conduits.

19. A dryer for drying a compressed gas, which dryer comprises at least two vessels containing therein a regenerable desiccant and a controllable valve system, wherein this valve system is such that at least one vessel is always being regenerated while the other vessels dry the compressed gas, whereby the vessels are successively regenerated in turn by control of the valve system, and wherein the dryer is provided with a regeneration conduit for supplying a hot regeneration gas to the vessel being regenerated, wherein the regeneration conduit of the dryer is provided with a four-way valve according to claim 1.

* * * * *